United States Patent
Sun et al.

(10) Patent No.: US 12,441,145 B2
(45) Date of Patent: Oct. 14, 2025

(54) DAMPING MODULE ALLOWING FOR MOUNTING OF ROTARY WHEEL, AND MOBILE APPARATUS

(71) Applicants: GREE ELECTRIC APPLIANCES, INC. OF ZHUHAI, Zhuhai (CN); ZHUHAI LEAYUN TECHNOLOGY CO., LTD, Zhuhai (CN)

(72) Inventors: Huanhuan Sun, Zhuhai (CN); Changfeng Liu, Zhuhai (CN)

(73) Assignees: GREE ELECTRIC APPLIANCES, INC. OF ZHUHAI, Guangdong (CN); ZHUHAI LEAYUN TECHNOLOGY CO. LTD., Guangdong (CN)

( * ) Notice: Subject to any disclaimer, the term of this patent is extended or adjusted under 35 U.S.C. 154(b) by 420 days.

(21) Appl. No.: 18/005,536

(22) PCT Filed: Aug. 13, 2021

(86) PCT No.: PCT/CN2021/112576
§ 371 (c)(1),
(2) Date: Jan. 13, 2023

(87) PCT Pub. No.: WO2022/095535
PCT Pub. Date: May 12, 2022

(65) Prior Publication Data
US 2023/0271467 A1 Aug. 31, 2023

(30) Foreign Application Priority Data
Nov. 3, 2020 (CN) .......................... 202011212439.2

(51) Int. Cl.
*B60G 11/14* (2006.01)
*B60G 3/20* (2006.01)
(Continued)

(52) U.S. Cl.
CPC ................ *B60G 11/14* (2013.01); *B60G 3/20* (2013.01); *B60K 7/0007* (2013.01); *B62D 61/06* (2013.01);
(Continued)

(58) Field of Classification Search
CPC ...... B60G 11/14; B60G 3/20; B60G 2200/13; B60G 2206/122; B60G 2800/162;
(Continued)

(56) References Cited

U.S. PATENT DOCUMENTS 2,891,764 A * 6/1959 Pearne ...................... B66F 3/24
267/248
4,534,433 A * 8/1985 Burbank ................ B60B 33/045
180/21
(Continued)

FOREIGN PATENT DOCUMENTS

| AU | 2019100248 A4 | 4/2019 |
| CN | 201574260 U | 9/2010 |

(Continued)

OTHER PUBLICATIONS

Computer generated English translation of CN 207241334 (Year: 2025).*
(Continued)

*Primary Examiner* — Paul N Dickson
*Assistant Examiner* — Tiffany L Webb
(74) *Attorney, Agent, or Firm* — Armstrong Teasdale LLP

(57) ABSTRACT

Some embodiments of the present disclosed provide a damping module allowing for mounting of a rotary wheel and a mobile apparatus. The damping module includes a bearing member, extending in a horizontal direction and having a left assembly portion and a right assembly portion spaced apart from each other; a bent arm bracket, disposed on the right assembly portion of the bearing member; a
(Continued)

swinging bent arm, including an upper end portion, a lower end portion allowing for mounting of the rotary wheel, and a bent portion pivotally connected to the bent arm bracket; a transmission member connected with the upper end portion of the swinging bent arm; and a damping mechanism, disposed on the left assembly portion of the bearing member and connected with the transmission member.

19 Claims, 2 Drawing Sheets

(51) Int. Cl.
    *B60K 7/00* (2006.01)
    *B62D 61/06* (2006.01)

(52) U.S. Cl.
    CPC .... *B60G 2200/13* (2013.01); *B60G 2200/422* (2013.01); *B60G 2202/12* (2013.01); *B60G 2206/122* (2013.01); *B60G 2800/162* (2013.01); *B60K 2007/0038* (2013.01)

(58) Field of Classification Search
    CPC ... B60G 3/02; B60G 3/12; B60G 3/18; B60G 11/16; B60G 15/02; F16F 15/067; B60B 33/045
    See application file for complete search history.

(56) References Cited

U.S. PATENT DOCUMENTS

| | | | | |
|---|---|---|---|---|
| 10,736,479 | B2 * | 8/2020 | Wei | A47L 9/2852 |
| 11,186,469 | B2 * | 11/2021 | Goncalves | G08B 21/18 |
| 12,179,546 | B2 * | 12/2024 | Kim | B60G 3/04 |
| 2020/0282788 | A1 | 9/2020 | Wolf-Monheim | |

FOREIGN PATENT DOCUMENTS

| | | | | |
|---|---|---|---|---|
| CN | 204451424 | U | | 7/2015 |
| CN | 205573522 | U | | 9/2016 |
| CN | 107869548 | A | | 4/2018 |
| CN | 207241334 | U | * | 4/2018 |
| CN | 108454319 | A | | 8/2018 |
| CN | 207916480 | U | | 9/2018 |
| CN | 208730706 | U | | 4/2019 |
| CN | 110077514 | A | | 8/2019 |
| CN | 110203030 | A | | 9/2019 |
| CN | 110802986 | A | | 2/2020 |
| CN | 210479591 | U | | 5/2020 |
| CN | 111437123 | A | | 7/2020 |
| CN | 211543148 | U | | 9/2020 |
| CN | 211567568 | U | | 9/2020 |
| CN | 111731036 | A | | 10/2020 |
| CN | 111765192 | A | | 10/2020 |
| CN | 112413049 | A | | 2/2021 |
| DE | 29801892 | U1 | | 4/1998 |
| DE | 102015202834 | A1 | | 8/2015 |

OTHER PUBLICATIONS

International Search Report for corresponding International App. No. PCT/CN2021/112576, mailed Oct. 28, 2021, 3 pages.

The first office action of counterpart CN application No. 2020112124392 was issued on Jun. 23, 2021.

The third office action of counterpart CN application No. 2020112124392 was issued on Nov. 2, 2021.

* cited by examiner

DAMPING MODULE ALLOWING FOR MOUNTING OF ROTARY WHEEL, AND MOBILE APPARATUS

CROSS-REFERENCE TO RELATED APPLICATION

The present application is a National Stage Entry of International Application No. PCT/CN2021/112576, filed Aug. 13, 2021, which claims priority to Chinese patent application No. 202011212439.2, filed on Nov. 3, 2020 before the CNIPA, China National Intellectual Property Administration with the title of "Damping Module Allowing for Mounting of Rotary Wheel, and Mobile Apparatus," the disclosure of which are incorporated herein in their entirety by reference.

TECHNICAL FIELD

The present disclosure belongs to a technical field of accessories for mobile apparatuses, and particularly relates to a damping module allowing for mounting of a rotary wheel, and a mobile apparatus with the damping module.

BACKGROUND

With an improvement of people's quality of life and a rapid development of artificial intelligence, mobile apparatuses have been widely used in various industries, and most mobile apparatuses have the advantages of simple mechanism, high moving speed, flexible mobility, high operation efficiency, and high bearing capacity. However, due to the uneven road surface and the influence of various small obstacles, a mobile apparatus may jolt or even shakes violently in the moving process, which makes the route of the mobile apparatus shift, resulting in unpredictable dangers.

At present, the mobile apparatus is prevented from jolting and shaking violently during driving mainly by mounting a damping module at the position of a hub. A damping module known to inventors is mainly a vertical damping module including a compression spring. Although the compression spring achieves the role of damping, the compression spring is generally required to be large in order to meet the requirements for use intensity. As a result, the mobile apparatus needs to have a high height, which not only decreases the space utilization rate of the mobile apparatus, but also limits the use space of the mobile apparatus.

SUMMARY

In order to solve all or part of the above problems, the present disclosure aims to provide a damping module allowing for mounting of a rotary wheel, and a mobile apparatus. By means of the damping module and the mobile apparatus, the problem that the height of a mobile apparatus is too high due to the vertical layout of an existing damping module is solved, the space utilization rate of the mobile apparatus can be increased while the purpose of damping is achieved, the limitation on the use space of the mobile apparatus can be reduced, and the stability of the mobile apparatus during moving can also be improved.

According to a first aspect of the present disclosure, a damping module allowing for mounting of a rotary wheel is provided. The damping module includes a bearing member, extending in a horizontal direction and having a left assembly portion and a right assembly portion spaced apart from each other; a bent arm bracket, disposed on the right assembly portion of the bearing member; a swinging bent arm, including an upper end portion, a lower end portion allowing for mounting of the rotary wheel, and a bent portion connecting the upper end portion with the lower end portion and pivotally connected to the bent arm bracket; a transmission member, having a right end portion connected with the upper end portion of the swinging bent arm; and a damping mechanism, disposed on the left assembly portion of the bearing member and connected with a left end portion of the transmission member.

In some embodiments, the damping mechanism is a single-spring damping mechanism or a double-spring damping mechanism.

In some embodiments, the double-spring damping mechanism includes: a left support and a right support, disposed on the left assembly portion of the bearing member in a spaced manner; a first tie rod and a second tie rod, parallel to each other and penetrating through the left support and the right support; a first compression spring and a second compression spring, the first compression spring being disposed on the first tie rod in a sleeving manner and located between the left support and the right support, the second compression spring being disposed on the second tie rod in a sleeving manner and located between the left support and the right support; a first pressure plate and a second pressure plate, the first pressure plate being disposed on the first tie rod in a sleeving manner and located between the left support and the first compression spring, the second pressure plate being disposed on the second tie rod in a sleeving manner and located between the left support and the second compression spring; a first stop member and a second stop member, the first stop member being disposed on the first tie rod and located between the first pressure plate and the left support, the second stop member being disposed on the second tie rod and located between the second pressure plate and the left support; a retraction drive member, connected to the transmission member and disposed on the first tie rod and the second tie rod in a sleeving manner; and a third stop member and a fourth stop member, the third stop member being disposed at a right end of the first tie rod and causing the retraction drive member to be limited between the third stop member and the right support, the fourth stop member being disposed on the second tie rod and causing the retraction drive member to be limited between the fourth stop member and the right support.

In some embodiments, the left support and the right support are each of an L-shaped structure with a first plate portion and a second plate portion, the first plate portion of the left support and the first plate portion of the right support are fixed to the bearing member, and the second plate portion of the left support and the second plate portion of the right support are capable of jointly carrying the first tie rod and the second tie rod that penetrate through the left support and the right support.

In some embodiments, the transmission member includes a connecting rod, one end of the connecting rod is pivotally connected with the retraction drive member, and the other end of the connecting rod is pivotally connected with the swinging bent arm.

In some embodiments, the first stop member, the second stop member, the third stop member and the fourth stop member are nuts capable of being in threaded connection with the first tie rod or the second tie rod.

In some embodiments, the swinging bent arm is of a 7-shaped structure with a short arm and a long arm, and the upper end portion and the lower end portion of the swinging bent arm are formed on the short arm and the long arm respectively.

In some embodiments, the rotary wheel includes a hub motor, and a tire disposed on the hub motor in a sleeving manner.

In some embodiments, the bent arm bracket includes an L-shaped bracket disposed on the right assembly portion of the bearing member, and a shaft pressure plate detachably connected with the L-shaped bracket, the bearing member and the L-shaped bracket are one-piece castings, and the swinging bent arm is pivotally connected between the shaft pressure plate and the L-shaped bracket.

In some embodiments, the damping mechanism includes: a left support and a right support, disposed on the left assembly portion of the bearing member in a spaced manner; a tie rod member, disposed on the left assembly portion of the bearing member in a spaced manner; a compression spring member, being disposed on the tie rod member in a sleeving manner and located between the left support and the right support; and a retraction drive member, connected with the transmission member and disposed on the tie rod member in a sleeving manner.

In some embodiments, the damping mechanism comprises a pressure plate member, wherein the pressure plate member is disposed on the tie rod member in a sleeving manner and located between the left support and the compression spring member.

In some embodiments, the swinging bent arm comprises a short arm and a long arm, an included angle between the short arm and the long arm is in a range of 90° to 130°, and the upper end portion and the lower end portion of the swinging bent arm are formed on the short arm and the long arm respectively.

In some embodiments, wherein the included angle between the short arm and the long arm is 120°.

According to a second aspect of the present disclosure, a mobile apparatus is provided. The mobile apparatus includes three or more damping modules.

Based on the above technical solution, for the damping module allowing for mounting of the rotary wheel, and the mobile apparatus according to the present disclosure, by changing the vertical layout of the damping module known to inventors to the horizontal layout, the height of the damping module is reduced, so that the height of the mobile apparatus may be reduced, and the limitation on the use space of the mobile apparatus is reduced. At the same time, as the height of the mobile apparatus is reduced, the center of gravity of the mobile apparatus is lowered, and the stability of the mobile apparatus during moving is improved. Moreover, due to the horizontal layout, the space occupied by the damping module in the mobile apparatus can also be reduced, so that the space utilization rate of the mobile apparatus can be increased. Therefore, by means of the damping module allowing for mounting of the rotary wheel, and the mobile apparatus according to the present disclosure, the problem that the height of the mobile apparatus is too high due to the vertical layout of the existing damping module can be solved. Moreover, the space utilization rate of the mobile apparatus can be increased while the purpose of damping is achieved, the limitation on the use space of the mobile apparatus can be reduced, and the stability of the mobile apparatus during moving can also be improved.

BRIEF DESCRIPTION OF THE DRAWINGS

Hereinafter, preferred embodiments of the present disclosure will be described in detail with reference to the accompanying drawings. In the figures.

In the figures, like parts are denoted with like reference numerals. The figures are not drawn to actual scale.

DETAILED DESCRIPTION OF THE EMBODIMENTS

The present disclosure will be further described hereinafter with reference to the accompanying drawings.

Figure 1:
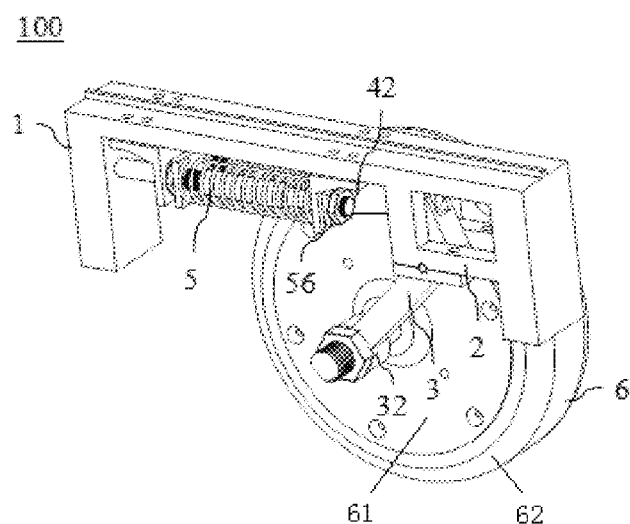
FIG. 1 illustrates a schematic structural view of a damping module allowing for mounting of a rotary wheel according to an embodiment of the present disclosure.
Figure 2:
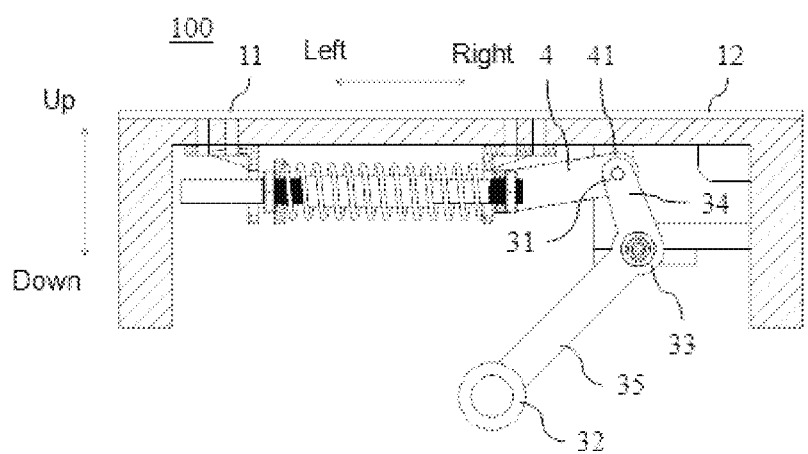
FIG. 2 illustrates a cross-sectional view of a damping module shown in FIG. 1.

FIG. 1 shows a schematic structural view of a damping module allowing for mounting of a rotary wheel according to an embodiment of the present disclosure. FIG. 2 is a cross-sectional view of the damping module shown in FIG. 1. As shown in FIG. 1 and FIG. 2, the present disclosure provides a damping module 100 allowing for mounting of a rotary wheel 6. The damping module includes a bearing member 1, a bent arm bracket 2, a swinging bent arm 3, a transmission member 4, and a damping mechanism 5. The bearing member 1 extends in a horizontal direction, and has a left assembly portion 11 and a right assembly portion 12 spaced apart from each other. The bent arm bracket 2 is disposed on the right assembly portion 12 of the bearing member 1. The swinging bent arm 3 includes an upper end portion 31, a lower end portion 32 allowing for mounting of the rotary wheel 6, and a bent portion 33 connecting the upper end portion 31 with the lower end portion 32 and pivotally connected to the bent arm bracket 2. In some embodiments, the rotary wheel 6 includes a hub motor 61, and a tire 62 disposed on the hub motor 61 in a sleeving manner. A right end portion 41 of the transmission member 4 is connected with the upper end portion 31 of the swinging bent arm 3. The damping mechanism 5 is disposed on the left assembly portion 11 of the bearing member 1, and connected with a left end portion 42 of the transmission member 4.

For the damping module 100 allowing for mounting of the rotary wheel 6 according to the present disclosure, by changing the vertical layout of the damping module known to inventors to the horizontal layout, the height of the damping module 100 can be reduced, so that the height of the mobile apparatus can be reduced, and the limitation on the use space of the mobile apparatus is reduced. Moreover, due to the horizontal layout, the space occupied by the damping module 100 in the mobile apparatus can also be reduced, so that the space utilization rate of the mobile apparatus is increased. Therefore, by means of the damping module 100 allowing for mounting of the rotary wheel 6 according to the present disclosure, the problem that the height of the mobile apparatus is too high due to the vertical layout of the existing damping module can be solved. Moreover, the space utilization rate of the mobile apparatus can be increased while the purpose of damping is achieved, and the limitation on the use space of the mobile apparatus can be reduced.

Figure 3:
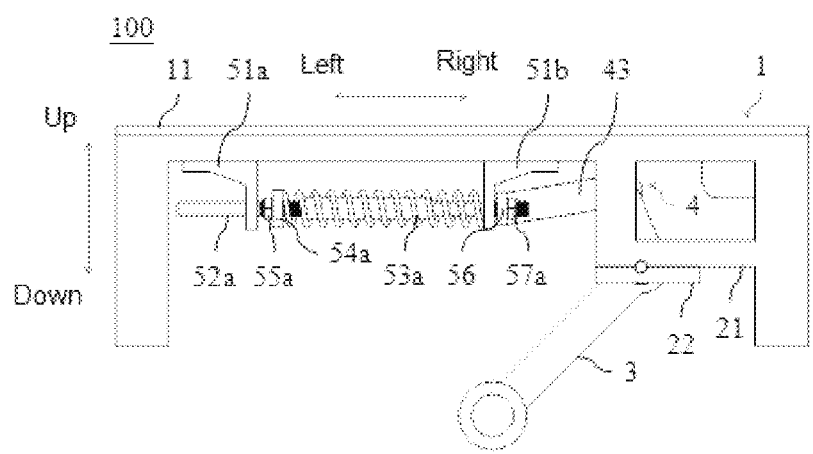
FIG. 3 illustrates a front view of a damping module shown in FIG. 1.
Figure 4:
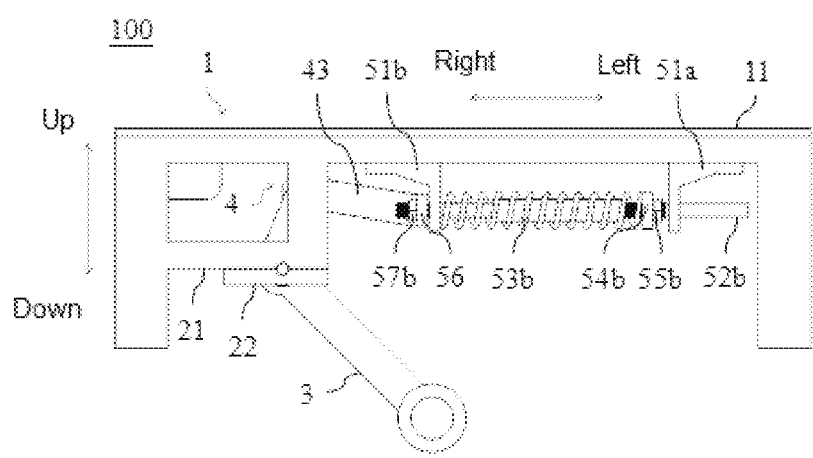
FIG. 4 illustrates a rear view of a damping module shown in FIG. 1.

In some embodiments, the damping mechanism 5 is a single-spring damping mechanism or a double-spring damping mechanism. In some implementations, the damping mechanism 5 is selected as a double-spring damping mechanism. As shown in FIG. 3 and FIG. 4, the double-spring damping mechanism includes: a left support 51a and a right support 51b, disposed on the left assembly portion 11 of the bearing member 1 in a spaced manner; a first tie rod 52a and a second tie rod 52b, parallel to each other and penetrating through the left support 51a and the right support 51b; a first compression spring 53a and a second compression spring 53b, the first compression spring 53a being disposed on the first tie rod 52a in a sleeving manner and located between the left support 51a and the right support 51b, the second compression spring 53b being disposed on the second tie rod 52b in a sleeving manner and located between the left support 51a and the right support 51b; a first pressure plate 54a and a second pressure plate 54b, the first pressure plate 54a being disposed on the first tie rod 52a in a sleeving manner and located between the left support 51a and the first compression spring 53a, the second pressure plate 54b being disposed on the second tie rod 52b in a sleeving manner and located between the left support 51a and the second compression spring 53b; a first stop member 55a and a second stop member 55b, the first stop member 55a being disposed on the first tie rod 52a and located between the first pressure plate 54a and the left support 51a, the second stop member 55b being disposed on the second tie rod 52b and located between the second pressure plate 54b and the left support 51a; a retraction drive member 56, connected with the transmission member 4 and disposed on the first tie rod 52a and the second tie rod 52b in a sleeving manner; and a third stop member 57a and a fourth stop member 57b, the third stop member 57a being disposed at a right end of the first tie rod 52a and causing the retraction drive member 56 to be limited between the third stop member and the right support 51b, the fourth stop member 57b being disposed on the second tie rod 52b and causing the retraction drive member 56 to be limited between the fourth stop member and the right support 51b. By means of the double-spring damping mechanism, the size of each spring can be reduced by reducing the force on each spring, so that the space occupied by the damping module 100 in the mobile apparatus can be further reduced while the strength required for use is met, and the space utilization rate of the mobile apparatus is increased. At the same time, as the double-spring damping mechanism uses the compression springs which have a longer service life than tension springs, the service life of the damping mechanism 5 is prolonged, and thus the service life of the damping module 100 is prolonged.

In some embodiments, the left support 51a and the right support 51b are each of an L-shaped structure with a first plate portion and a second plate portion. The first plate portion of the left support 51a and the first plate portion of the right support 51b are fixed to the bearing member 1. The second plate portion of the left support 51a and the second plate portion of the right support 51b are capable of jointly carrying the first tie rod 52a and the second tie rod 52b that penetrate through the left support and the right support. In some embodiments, the left support 51a and the right support 51b not only may effectively carry the first tie rod 52a and the second tie rod 52b, but also have the advantages of simple structure, low cost, etc. In some embodiments, the left support 51a and the right support 51b can be selected as single L-shaped structures, and the left support 51a and the right support 51b can also be selected as components formed by two L-shaped structures. The specific connection relationships and the manner of use have been described above, and will thus not be repeated here.

As shown in FIG. 1, FIG. 3, and FIG. 4, in this embodiment, the transmission member 4 includes a connecting rod 43, one end of the connecting rod 43 is pivotally connected with the retraction drive member 56, and the other end of the connecting rod is pivotally connected with the swinging bent arm 3. The connecting rod 43 can effectively transfer the force of the swinging bent arm 3 and the rotary wheel 6 to the damping mechanism 5 in a smooth, safe and efficient manner, so as to ensure that the damping mechanism 5 can cushion the swinging bent arm 3 and the rotary wheel 6. In addition to the connecting rod 43, the transmission member 4 can also be directly selected as a flexible component, such as a rope, that can meets the strength required or use.

In some embodiments, the first stop member 55a, the second stop member 55b, the third stop member 57a and the fourth stop member 57b are nuts capable of being in threaded connection with the first tie rod 52a or the second tie rod 52b. The first stop member 55a and the second stop member 55b are preferably nuts to facilitate the adjustment of the degree of compression of the springs, so that the damping effect of the damping module 100 is adjusted. The third stop member and the fourth stop member 57b are preferably nuts to facilitate the assembly and disassembly of the damping mechanism 5, so that a damaged part is convenient to repair or replace. In this way, the use cost of the damping module 100 can be reduced. In addition to nuts, the first stop member 55a, the second stop member 55b, the third stop member 57a, and the fourth stop member 57b can also be selected as other stop structures, such as a snap spring structure.

As shown in FIG. 2, in some embodiments, the swinging bent arm 3 is of a 7-shaped structure with a short arm 34 and a long arm 35, and the upper end portion 31 and the lower end portion 32 of the swinging bent arm 3 are formed on the short arm 34 and the long arm 35 respectively. With this structure, the travel required for the short arm 34 to move the first tie rod 52a and the second tie rod 52b through the transmission member 4 can be shortened, so that the damping effect is achieved quickly, and the space occupied by the damping module 100 is reduced.

As shown in FIG. 3 and FIG. 4, in some embodiments, the bent arm bracket 2 includes an L-shaped bracket 21 disposed on the right assembly portion 12 of the bearing member 1, and a shaft pressure plate 22 detachably connected with the L-shaped bracket 21. The bearing member 1 and the L-shaped bracket 21 are one-piece castings. The swinging bent arm 3 is pivotally connected between the L-shaped bracket 21 and the shaft pressure plate 22. Due to the detachable connection between the shaft pressure plate 22 and the L-shaped bracket 21, the swinging bent arm 3 can be assembled and disassembled conveniently, so as to facilitate the repair or replacement of the swinging bent arm 3 and reduce the use cost of the damping module 100. The bearing member 1 and the L-shaped bracket 21 are preferably one-piece castings, which can simplify the design, manufacturing and assembly process of the parts and facilitate machining and better control over machining accuracy, thereby not only reducing the production cost of the damping module 100, but also improving the overall strength of the bearing member and the L-shaped bracket.

In some embodiments, the damping mechanism includes: a left support and a right support, disposed on the left assembly portion of the bearing member in a spaced manner; a tie rod member, disposed on the left assembly portion of the bearing member in a spaced manner; a compression spring member, being disposed on the tie rod member in a sleeving manner and located between the left support and the right support; and a retraction drive member, connected with the transmission member and disposed on the tie rod member in a sleeving manner.

The number of the tie rod member is two, two tie rod members are the first tie rod and the second tie rod respectively; the number of the compression spring members is two, two compression spring members are the first compression spring and the second compression spring respectively.

In some embodiments, the damping mechanism comprises a pressure plate member, wherein the pressure plate member is disposed on the tie rod member in a sleeving manner and located between the left support and the compression spring member.

The number of the pressure plate is two, two pressure plates are the first pressure plate and the second pressure plate.

In some embodiments, the swinging bent arm comprises a short arm and a long arm, an included angle between the short arm and the long arm is in a range of 90° to 130°, and the upper end portion and the lower end portion of the swinging bent arm are formed on the short arm and the long arm respectively.

In some embodiments, wherein the included angle between the short arm and the long arm is 120°.

In an embodiment not shown, a mobile apparatus is further provided. The mobile apparatus includes three or more of the above damping modules 100. Since the damping modules 100 have the advantages of being low in height and occupying a small space, the height of the mobile apparatus can be reduced, and the limitation on the use space of the mobile apparatus is reduced. In addition, the stability of the mobile apparatus during moving is improved, and at the same time, the space utilization rate of the mobile apparatus is increased.

In summary, by means of the damping module 100 allowing for mounting of the rotary wheel 6, and the mobile apparatus according to the present disclosure, the problem that the height of the mobile apparatus is too high due to the vertical layout of the existing damping module can be solved. Moreover, the space utilization rate of the mobile apparatus can be increased while the purpose of damping is achieved, the limitation on the use space of the mobile apparatus can be reduced, and the stability of the mobile apparatus during moving can also be improved.

In the description of the present disclosure, it is to be understood that the terms "upper", "lower", "left", "right", etc. designate orientations or positional relationships based on the orientation or positional relationships shown in the accompanying diagrams, are merely for convenience in describing and simplifying the present disclosure, and do not indicate or imply that the referenced devices or elements must have a particular orientation, be constructed and operated in a particular orientation, and thus are not to be construed as limiting the present disclosure.

Furthermore, the terms "first", "second", and the like are merely provided for descriptive purposes and are not to be construed as indicating or implying relative importance or implicitly indicating the number of technical features indicated. In the description of the present disclosure, "a plurality of" refers to two or more, unless expressly and specifically limited otherwise.

In the present disclosure, unless expressly stated or limited otherwise, the terms "mounted", "connected", "connecting", "fixed", and the like are to be interpreted broadly. For example, it may be a fixed connection, a detachable connection, or an integral connection; or it may be a mechanical connection or an electrical connection, or it may be a direct connection, or an indirect connection through an intermediate medium; or it may be the communication between two elements or the interaction relationship between two elements. The specific meaning of the above terms in the present disclosure may be understood by those of ordinary skill in the art depending on the particular circumstances.

The foregoing are merely preferred embodiments of the present disclosure, and the scope of the present disclosure is not limited thereto. Any person skilled in the art may easily make changes or modifications within the technical scope of the present disclosure, and such changes or modifications are intended to be covered by the scope of the present disclosure. Accordingly, the scope of the present disclosure shall be as set forth in the claims. The technical features mentioned in the various embodiments may be combined in any manner as long as there is no structural conflict. The present disclosure is not limited to the particular embodiments disclosed herein, but includes all technical solutions falling within the scope of the claims.

What is claimed is:

1. A damping module allowing for mounting of a rotary wheel, comprising:
   a bearing member, extending in a horizontal direction and having a left assembly portion and a right assembly portion spaced apart from each other;
   a bent arm bracket, disposed on the right assembly portion of the bearing member;
   a swinging bent arm, comprising an upper end portion, a lower end portion allowing for mounting of the rotary wheel, and a bent portion connecting the upper end portion with the lower end portion and pivotally connected to the bent arm bracket;
   a transmission member, having a right end portion connected with the upper end portion of the swinging bent arm; and
   a damping mechanism, disposed on the left assembly portion of the bearing member and connected with a left end portion of the transmission member,
   wherein the bent arm bracket comprises an L-shaped bracket disposed on the right assembly portion of the bearing member, and a shaft pressure plate detachably connected with the L-shaped bracket, the bearing member and the L-shaped bracket are one-piece castings, and the swinging bent arm is pivotally connected between the shaft pressure plate and the L-shaped bracket.

2. The damping module as claimed in claim 1, wherein the damping mechanism is a single-spring damping mechanism or a double-spring damping mechanism.

3. The damping module as claimed in claim 2, wherein the double-spring damping mechanism comprises:
   a left support and a right support, disposed on the left assembly portion of the bearing member in a spaced manner;
   a first tie rod and a second tie rod, parallel to each other and penetrating through the left support and the right support;
   a first compression spring and a second compression spring, the first compression spring being disposed on the first tie rod in a sleeving manner and located between the left support and the right support, the second compression spring being disposed on the second tie rod in a sleeving manner and located between the left support and the right support;
   a first pressure plate and a second pressure plate, the first pressure plate being disposed on the first tie rod in a sleeving manner and located between the left support and the first compression spring, the second pressure plate being disposed on the second tie rod in a sleeving manner and located between the left support and the second compression spring;

a first stop member and a second stop member, the first stop member being disposed on the first tie rod and located between the first pressure plate and the left support, the second stop member being disposed on the second tie rod and located between the second pressure plate and the left support;

a retraction drive member, connected with the transmission member and disposed on the first tie rod and the second tie rod in a sleeving manner; and a third stop member and a fourth stop member, the third stop member being disposed at a right end of the first tie rod and causing the retraction drive member to be limited between the third stop member and the right support, the fourth stop member being disposed on the second tie rod and causing the retraction drive member to be limited between the fourth stop member and the right support.

4. The damping module as claimed in claim 3, wherein the left support and the right support are each of an L-shaped structure with a first plate portion and a second plate portion, the first plate portion of the left support and the first plate portion of the right support are fixed to the bearing member, and the second plate portion of the left support and the second plate portion of the right support are capable of jointly carrying the first tie rod and the second tie rod that penetrate through the left support and the right support.

5. The damping module as claimed in claim 3, wherein the transmission member comprises a connecting rod, one end of the connecting rod is pivotally connected with the retraction drive member, and the other end of the connecting rod is pivotally connected with the swinging bent arm.

6. The damping module as claimed in claim 3, wherein the first stop member, the second stop member, the third stop member and the fourth stop member are nuts capable of being in threaded connection with the first tie rod or the second tie rod.

7. The damping module as claimed in claim 1, wherein the swinging bent arm is of a 7-shaped structure with a short arm and a long arm, and the upper end portion and the lower end portion of the swinging bent arm are formed on the short arm and the long arm respectively.

8. The damping module as claimed in claim 1, wherein the rotary wheel comprises a hub motor, and a tire disposed on the hub motor in a sleeving manner.

9. The damping module as claimed in claim 1, wherein the damping mechanism comprises:

a left support and a right support, disposed on the left assembly portion of the bearing member in a spaced manner;

a tie rod member, disposed on the left assembly portion of the bearing member;

a compression spring member, being disposed on the tie rod member in a sleeving manner and located between the left support and the right support; and a retraction drive member, connected with the transmission member and disposed on the tie rod member in a sleeving manner.

10. The damping module as claimed in claim 9, wherein the damping mechanism comprises a pressure plate member, wherein the pressure plate member is disposed on the tie rod member in a sleeving manner and located between the left support and the compression spring member.

11. The damping module as claimed in claim 1, wherein the swinging bent arm comprises a short arm and a long arm, an included angle between the short arm and the long arm is in a range of 90° to 130°, and the upper end portion and the lower end portion of the swinging bent arm are formed on the short arm and the long arm respectively.

12. The damping module as claimed in claim 11, wherein the included angle between the short arm and the long arm is 120°.

13. A mobile apparatus, comprising the damping module as claimed in claim 1.

14. The mobile apparatus as claimed in claim 13, wherein the mobile apparatus comprises three damping modules.

15. The mobile apparatus as claimed in claim 14, wherein the damping mechanism in the damping module is a single-spring damping mechanism or a double-spring damping mechanism.

16. The mobile apparatus as claimed in claim 15, wherein the double-spring damping mechanism comprises:

a left support and a right support, disposed on the left assembly portion of the bearing member in a spaced manner;

a first tie rod and a second tie rod, parallel to each other and penetrating through the left support and the right support;

a first compression spring and a second compression spring, the first compression spring being disposed on the first tie rod in a sleeving manner and located between the left support and the right support, the second compression spring being disposed on the second tie rod in a sleeving manner and located between the left support and the right support;

a first pressure plate and a second pressure plate, the first pressure plate being disposed on the first tie rod in a sleeving manner and located between the left support and the first compression spring, the second pressure plate being disposed on the second tie rod in a sleeving manner and located between the left support and the second compression spring;

a first stop member and a second stop member, the first stop member being disposed on the first tie rod and located between the first pressure plate and the left support, the second stop member being disposed on the second tie rod and located between the second pressure plate and the left support;

a retraction drive member, connected with the transmission member and disposed on the first tie rod and the second tie rod in a sleeving manner; and a third stop member and a fourth stop member, the third stop member being disposed at a right end of the first tie rod and causing the retraction drive member to be limited between the third stop member and the right support, the fourth stop member being disposed on the second tie rod and causing the retraction drive member to be limited between the fourth stop member and the right support.

17. The mobile apparatus as claimed in claim 16, wherein the left support and the right support are each of an L-shaped structure with a first plate portion and a second plate portion, the first plate portion of the left support and the first plate portion of the right support are fixed to the bearing member, and the second plate portion of the left support and the second plate portion of the right support are capable of jointly carrying the first tie rod and the second tie rod that penetrate through the left support and the right support.

18. The mobile apparatus as claimed in claim 17, wherein the transmission member comprises a connecting rod, one end of the connecting rod is pivotally connected with the retraction drive member, and the other end of the connecting rod is pivotally connected with the swinging bent arm.

19. The mobile apparatus as claimed in claim 14, wherein the rotary wheel comprises a hub motor, and a tire disposed on the hub motor in a sleeving manner.

\* \* \* \* \*